Figure 1:
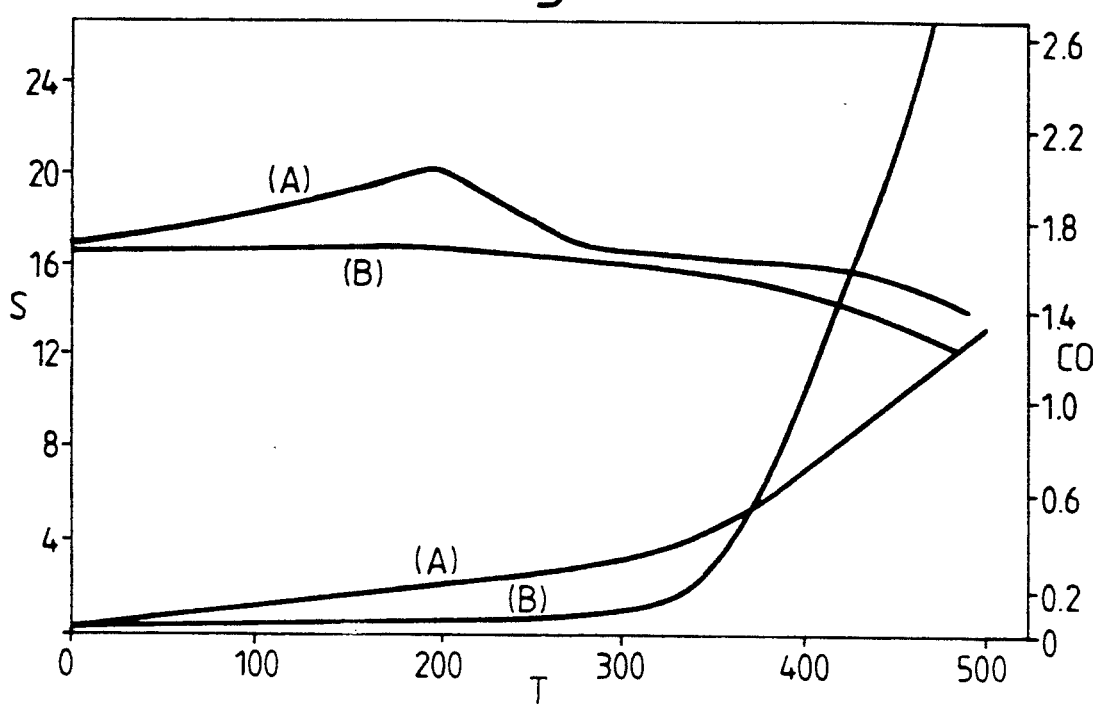

United States Patent [19]

Poyner et al.

[11] Patent Number: 5,274,019

[45] Date of Patent: Dec. 28, 1993

[54] PHOTODEGRADABLE COMPOSITIONS

[75] Inventors: William R. Poyner, Worcestershire; Khirud B. Chakraborty, Birmingham, both of England

[73] Assignee: Robinson Brothers Limited, West Bromwich, England

[21] Appl. No.: 49,516

[22] Filed: Apr. 19, 1993

Related U.S. Application Data

[63] Continuation of Ser. No. 782,405, Oct. 25, 1991, abandoned.

[30] Foreign Application Priority Data

Oct. 25, 1990 [GB] United Kingdom ............... 9023238

[51] Int. Cl.$^5$ .............................................. C08J 5/08
[52] U.S. Cl. .................................. 524/358; 523/124; 523/125
[58] Field of Search ............... 523/124, 125; 524/358

[56] References Cited

U.S. PATENT DOCUMENTS

| | | | |
|---|---|---|---|
| 3,852,227 | 12/1974 | Matsoda et al. | 524/358 |
| 4,056,665 | 11/1977 | Taylor et al. | 524/358 |
| 4,102,839 | 7/1978 | Crochemore et al. | 524/358 |
| 4,121,025 | 10/1978 | Scott et al. | 523/125 |
| 4,252,698 | 2/1981 | Ito et al. | 260/18 EP |
| 4,360,606 | 11/1982 | Tobias et al. | 523/125 |
| 4,939,194 | 7/1990 | Scott et al. | 523/126 |
| 5,070,128 | 12/1991 | Gay | 524/357 |

FOREIGN PATENT DOCUMENTS 391811 10/1990 European Pat. Off. .
2423510 11/1979 France .

OTHER PUBLICATIONS

Yogev, A., Studies in Linear Dichroism, Journal of the American Chemical Society, vol. 74, No. 6, 6059–6061, Oct. 7, 1970.

*Primary Examiner*—Joseph L. Schofer
*Assistant Examiner*—Peter D. Mulcahy
*Attorney, Agent, or Firm*—Parmelee, Bollinger & Bramblett

[57] ABSTRACT

A polymer composition comprises a minor amount of a pro-degradant selected from essentially carboxycylic β-diketones and metal complexes thereof, e.g. 2,2'-methylene(1,3-cyclohexanedione) or its Mn(II) or Zn complex. A film of the composition may be used for the protection of seeds or seedlings at an agricultural or horticultural locus.

17 Claims, 2 Drawing Sheets

PHOTODEGRADABLE COMPOSITIONS

This is a continuation of copending application(s) Ser. No. 07/782,405, on Oct. 25, 1991 now abandoned.

FIELD OF THE INVENTION

This invention relates to polymer compositions having controlled or deliberately shortened lifetimes.

BACKGROUND OF THE INVENTION

Photodegradable compositions are useful, for example, for making agricultural mulching film which can be used to protect seeds and seedlings but which rapidly degrades so that it does not interfere with ripening, harvesting or replanting. Such compositions are also useful to prevent the accumulation of litter.

It is well known that polymeric materials, especially plastics, are degraded by the action of heat, light and air. Apart from polymers specifically designed for high temperature applications, most polymers undergo heat degradation only during melt processing and forming. Usually, however, polymers are subject to light and air throughout their life, and the length of their life can be controlled by a suitable choice of additives.

Various systems have been suggested for controlling the life of polymers. For example, polymers have limited life if carbonyl groups are incorporated into the polymer by copolymerisation or graft copolymerisation. This technique has the disadvantage that separate polymerisations have to be carried out to produce polymers with different lifetimes. Consequently, it is often preferable to add pro-degradants to a polymer during processing.

Pro-degradants or pro-oxidants are usually compounds of multi-valent metals. U.S. Pat. No. 3,454,510 discloses as pro-oxidants the acetylacetonates of Mn, Co, Cr, Fe, Cu or V, the $C_{8-18}$ alkyl acetoacetate or $C_{8-18}$ alkylbenzoylacetate complexes of the same metals, Zn or Ni, or the stearates or oleates of Mn(II) and Co(II). Addition of one or more of these compounds to a polymer enables films to be prepared which last only during the growing period of a crop.

U.S. Pat. No. 4,048,410 discloses the addition to polymers of organic chelating agents which are expected to extract suitable metal ions from the environment and thus be subject to accelerated degradation. Many chelating agents are mentioned, including acetylacetone, acetonyl-acetone, benzoylacetone, thenoyl trifluoroacetone, trifluoroacetylacetone, dibenzoylmethane, dipivaloyl methane, n-dodecylacetylacetone, n-dodecylbenzoylacetone and diethyldithiocarbamate salts.

U.S. Pat. No. 4,121,025 discloses systems in which degradation-promoting metals are complexed with stabilising organic compounds or groups. Examples of such metals are Fe, Ag, Pd, Mo, Cr, W and Ce. Examples of the compounds or groups include tetramethylthiuram disulphide and bis-dithiocarbamates.

GB-A-1356107 discloses compositions containing Fe, Mn, Ag, Pd, Mo, Cr, W or Ce with a complexing agent which itself or as a metal complex is an antioxidant. Dialkyldithiocarbamic acids, iron dialkyldithiocarbamates and the specific combination of ion dibutyldithiocarbamate and zinc dibutyldithiocarbamate are described.

GB-A-1586344 discloses compositions containing at least one photo-activating metal complex (the complexing agent being stabilising) and at least one light-stabilising complex of Ni, Co or Cu. Examples are iron dimethyldithiocarbamate with nickeldibutyldithio-carbamate and iron dibutyldithiocarbamate with cobalt dibutyldithiocarbamate.

GB-A-2187193 discloses compositions containing transition metal complexes of oxygen ligands and transition or Group II or IV metal complexes of sulphur ligands, wherein the second complex is less than one-third of the total complex. Examples are iron acetylacetonate, iron acetylacetonate with zinc diethyldithiocarbamate, and iron acetylacetonate with nickel diethyldithiocarbamate. The sulphur complex is for thermal stabilisation.

EP-A-0216412 discloses mixtures of a copper ketonate or diketonate, e.g. copper acetylacetonate, and a zinc dithiocarbamate, e.g. zinc dimethyldithiocarbamate.

The known systems are effective but have disadvantages. For example, the very powerful iron acetylacetonate requires a stabiliser, e.g. zinc diethyldithiocarbamate, not only to provide an induction period but also to prevent deterioration of the plastic during initial processing (see FIG. 1 of GB-A-2187193).

SUMMARY OF THE INVENTION

It has now been found that $\beta$-diketones having a cyclic structure are surprisingly effective constituents of photodegradant systems in polymers such as polypropylene and polyethylene. Photo-degradant systems containing the cyclic diketones, themselves or their metal complexes, are stable at plastics processing temperatures, tend to stabilise the polymer during processing, and provide an induction period during which the plastic does not lose its strength or change colour.

The present invention can achieve the desirable object of a pro-degradant system having an extended induction period, during which there is substantially no loss of mechanical properties, followed by rapid degradation to complete breakdown of the polymer.

DESCRIPTION OF THE INVENTION

The polymer that is used in the invention may be any conventional material of the type used for, say, packaging or protective films. Polyolefins are preferred, particularly polypropylene and, especially, polyethylene. Low density polyethylene (LDPE) is the polymer of choice for packaging and agricultural film.

The amount of the pro-degradant diketone that is used is preferably 0.01 to 5%, more preferably 0.05 to 1%, by weight of the polymer. The diketone is essentially carbocyclic, i.e. the ring may optionally include heteroatoms such as O, S or N (optionally substituted), but these or any other structural components are not inconsistent with the presence of a —CO—CH$_2$—O— or —CO—CHZ—CO— group (Z is defined below).

By way of example, the diketone or its complex may have the formula

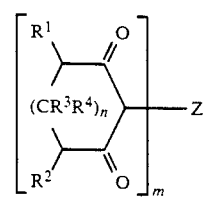

wherein n is 0, 1, 2 or 3; $R^1$, $R^2$, $R^3$ and $R^4$ are independently selected from H, a substituent and optionally-substituted hydrocarbyl of up to 18 C atoms, any substituents being chosen from oxo(=O), $NH_2$, (di)hydrocarbylamino, acylamino, COOH, hydrocarbyloxycarbonyl, CN, halogen and $NO_2$, or two of $R^1$, $R^2$ and $R^3$ together with the C atoms to which they are attached, form an aromatic ring optionally substituted as defined above; and either m is 1 and Z is H or m is an integer and Z is a metal or an optionally-substituted hydrocarbyl radical as defined above, having the valency m. It is also possible that, while the compound remains essentially carbocyclic, ($CR^3R^4$) is replaced by a heteroatom (including optionally-substituted NH).

If the pro-degradant in the form of a metal complex, the metal may be, for example, Zn, Cu, Fe, Mn, Ni, Co, Cr or V; the preferred metals are those that give pale-coloured complexes, e.g. Zn and Mn. n is usually one. One or more of $R^1$, $R^2$, $R^3$ and $R^4$ will often be H. $(CR^3R^4)_n$ is preferably $CH_2$. Substituents may have up to 12 C atoms.

In the given formula, m may be one. In this case, examples of suitable cyclic β-diketones are 1,3-cyclopentanedione, 1,3-cyclohexanedione, 1,3-cycloheptanedione and their substituted homologues in which both carbonyl groups are capable of tautomerising to enols simultaneously. Examples of these are dimedone (5,5-dimethyl-1,3-cyclohexanedione) and 5-phenyl-1,3-cyclohexanedione. Cyclic β-diketones where only the carbonyl group is capable of enolisation are also effective: examples are 1,3-indandione and lawsone. All the above compounds can be converted to enol ethers and are believed to retain pro-degradant properties, although their ability to form stable complexes with metals is much reduced.

Alternatively, m is 2 or more: a preferred group of such cyclic β-diketone derivatives comprises those in which two molecules of cyclic diketone are linked via an optionally-substituted methylene group, i.e. Z is —CHR—, R being H or optionally-substituted hydrocarbyl as defined above. Preferred diketones of this type are MBCD, i.e. 2,2'-methylenebis(1,3-cyclohexanedione), and 2,2'-benzylidenebis(1,3-cyclohexanedione). Such compounds may be formed by mixing a selected aldehyde (RCHO) with an aqueous or alcoholic solution of the diketone. In the case of MBCD, the simplest "coupled" derivative, using formaldehyde, an almost quantitative yield of a water-soluble and crystalline product can be achieved. The dione used can be either material isolated from an autoclave product solution (by acidification and filtration) or the untreated reduction liquor.

Particularly preferred compounds are those where Z is methylene or substituted methylene, preferred substituents being aryl or naphthyl optionally substituted by electron-withdrawing groups. The reaction of the β-diketone with aromatic aldehydes requires an alcoholic or aqueous medium and more forcing conditions. However, it is not difficult to prepare colourless crystalline derivatives from aldehydes such as benzaldehyde and naphthaldehyde in excellent yield.

These double diketone compounds can be used as accelerators of photo-degradation either as free ketones or as chelates with metals. Qualitative tests in the laboratory have indicated that substantially insoluble complexes of 1,3-dione with Fe(II), Fe(III), Mn(II), Cu and Zn are precipitated when a basic solution of 1,3-dione was reacted with the corresponding metal salt in aqueous medium.

The free ketones or the metal chelates can be used in combination with other pro-degradants or anti-degradants to provide systems with desired combinations of properties. Examples of suitable such other compounds are the dithiocarbamates disclosed and claimed in EP-A-0165005, e.g. zinc dialkyldithiocarbamates wherein each alkyl group is a branched-chain $C_{5-18}$ alkyl group, preferably isononyl. Another such other compound is a thiuram sulphide such as tetrabenzylthiuram disulphide; see EP-A-0413504 which is also incorporated herein by reference. Any such additive may be used in a range of amounts as for the diketone prodegradant.

Thus, for example, the degree of photo-activation imparted to LDPE by MBCD may be low. At higher concentrations, the additive, like most others, may exhibit difficulty in permitting the control of induction period and embrittlement time. It is therefore important to find a suitable class of compound capable of working synergically with the dione, in order to enhance photoactivity and give some measure of UV life control along the lines of that disclosed in GB-A-2187193, using mixed metal dithiocarbamates. Selection was restricted to essentially colourless compounds. These included:

(i) hindered phenols which were found to have little, if any, effect on dione performance;

(ii) benzophenones (light stabilisers) which gave the type of UV life control looked for but which added nothing to the photo-activity of the dione; and (iii) white dithiocarbamates: results using ZDNC (the Zn diisononyl salt) are given below.

The photo-activation of MBCD brought about by ZDNC is surprising, in view of the relatively poor photo-initiation properties of the metal complexes of the parent 1,3-cyclohexanedione. A preferred aspect of the invention lies in a combination of the more active metal complexes of both dione and dithiocarbamate groups, giving an ultra-fast photodegrading system.

Compositions of the invention may also include other, conventional ingredients for polymer compositions. For example, a phenolic or other anti-oxidant may be present, e.g. a hindered phenol of known type, e.g. in an amount of 0.005 to 5% by wt, with respect to the polymer. Such anti-oxidants will usually be present if the diketone and any other compatible materials of the type described above are added to commercial polymer.

The following Examples illustrate the invention, with reference to the accompanying drawings.

EXAMPLES 1 TO 11

Unstabilised polypropylene Propathene HF-26 (from the Alkathene range of polyolefines supplied by I.C.I. Ltd.) was processed in a RAPRA torque rheometer for 10 minutes at 180° C. with an additive (see Table 1) at a concentration of 0.1% by wt. The polymer blends were then compression-moulded at 180° C. to films 0.2 mm (0.008 inch) thick. Samples of each film were then exposed to UV irradiation in a cabinet and the progress of photooxidation was monitored by determining carbonyl formation in the polymer using a Perkin-Elmer 599 IR spectrophotometer. The time to onset of carbonyl formation is the induction period and the time to reach a carbonyl index of 0.4 is taken as the embrittlement time. The results are given in the following Table (in which f = fugitive, i.e. volatile at processing temperatures).

It can be seen from the Table that the simple cyclic diketones are too volatile to be used as pro-degradants in their free state. The 2,2'-alkylidene-bis-cyclic diketones in contrast are sufficiently non-volatile to survive processing operations and also provide an accelerated or more or less undelayed embrittlement time, while in some cases providing a usefully long induction period during which the mechanical properties of the film remain substantially unchanged.

EXAMPLES 12 TO 19

Unstabilised polypropylene was blended, as in Example 1, with 0.1% by wt of additives comprising complexes of cyclic diketones with various metals. Induction periods and embrittlement times for films tested as in Example 1 are given in the following Table.

It can be seen from the Table that the metal complexes behave similarly to the free ligands, which suggests that the structure of the ligand is the key factor in absorbing radiant energy and then dissipating the energy in ways that either contribute to the photo-degradation of the base or (as in the case of Examples 12, 13 and 14) provide partial stabilisation.

| Example | Additive (0.1% w/w) | Induction Period (h) | Embrittlement Time (h) |
|---|---|---|---|
| Control | None | 10 | 110 |
| Comp. | acetylacetone | f | f |
| 1 | 1,3-cyclohexanedione | f | f |
| 2 | dimedone | f | f |
| 3 | 5-phenyl-1,3-cyclo-hexanedione | f | f |
| 4 | MBCD | 35 | 105 |
| 5 | 2,2'-methylenebis(5-phenyl-1,3-cyclohexanedione) | 0 | 65 |
| 6 | 2,2'-methylenebis(5,5-dimethyl-1,3-cyclohexanedione) | 0 | 65 |
| 7 | 2,2'-benzylidenebis(1,3-cyclohexanedione) | 20 | 90 |
| 8 | 2,2'-cinnamylidenebis-(1,3-cyclohexanedione) | 25 | 90 |
| 9 | 2,2'-naphthylmethylene-bis(1,3-cyclohexanedione) | 0 | 60 |
| 10 | 2,2'-veratrylidenebis(1,3-cyclohexanedione) |  | 115 |
| 11 | 2,2'-furfurylidenebis(1,3-cyclohexanedione) |  | 125 |
| Comp. | Iron acetylacetonate | 0 | 90 |
| 12 | 1,3-cyclohexanedione/Zn | 90 | 165 |
| 13 | 1,3-cyclohexanedione/FeIII | 60 | 140 |
| 14 | 1,3-cyclohexanedione/CuII | 70 | 155 |
| 15 | 5-phenyl-1,3-cyclo-hexanedione/Zn | 25 | 75 |
| 16 | 5-phenyl-1,3-cyclohexane-dione/MnII |  | 85 |
| 17 | dimedone/Zn |  | 85 |
| 18 | MBCD/MnII |  | 105 |
| 19 | 2,2'-methylenebis(5-phenyl-1,3-cyclohexanedione)/MnII |  | 60 |

EXAMPLE 20

Screening tests of polypropylene film enabled comparison of bridged and complexed 1,3-diketone with metal dithiocarbamates. This polymer was selected because of the relative ease with which it can be photodegraded. The results of these tests showed that whereas all of the derivatives were photo-active, the bridged dione (as derived from an aldehyde) has a similar order of photo-activity to the iron dithiocarbamate and could be processed with ease at elevated temperature, giving a substantially odourless melt. Films produced were clear and colourless, with excellent retained physical properties.

Aromatic bridged diones, e.g. those produced from benzaldehyde and naphthaldehyde, were measurably more active than MBCD However, in view of greater difficulty in their synthesis and higher projected manufacturing costs, MBCD was selected for a more detailed examination, in LDPE.

MBCD was processed in unstabilised Alkathene polymer W.J.G.47 supplied by I.C.I. Processing at 180° C. was carried out for 10, 20 and 30 minutes, using 0.1% by wt dione concentration. The mixtures, after quenching, were compression moulded into uniform thickness film of 100 μm. Each film was exposed to standard UV light in a cabinet. Photo-oxidation progress was monitored by carbonyl determination in the polymer using a Perkin-Elmer I.R. Spectrophotometer. The loss of additive through decomposition and/or volatilisation whilst processing at 180° C. is too small to detect over a 10–20 minute period and is relatively small during the extended 30-minute processing cycle. This feature is essential for an additive used in such small quantities for a function of this type.

LDPE films containing (A) 0 or (B) 0.1% by wt MBCD were taken periodically, during exposure to UV radiation, for determination of tensile strength. FIG. 1 is a graph of the relationship between tensile strength (S; MPa) and UV irradiation time (T; hrs) as a measure of the induction period to carbonyl formation (CO =carbonyl index). Each tensile specimen and each film was 0.125 mm thick; the processing temperature and time were 180° C. and 10 min.

Mixtures of LDPE with 0.1% by wt MBCD were tested for melt flow index during an extended mixing cycle at 190° C. using a 2.5 kg load. There was substantially no change.

The value of these combined measurements is that any interaction between the additive and the polymer in pro-oxidation or chain cross-linking results in marked movement in melt flow index: a decrease is indicative of polymer cross-linking whereas an increase implies chain scission.

A significant fall in tensile strength in polyalkylenes denotes approaching embrittlement. Both results confirm the solubility and thermal inertness of this particular addition. They suggest that the diketone tends to stabilise LDPE in both the melt phase and when initially exposed to UV light as a film.

The in-depth testing of the dione in LDPE confirmed that this additive had potentially useful photo-activation properties. In addition, it had thermal stability, good melt colour with little apparent odour, and excellent processing properties.

EXAMPLE 21

ZDNC photolytically decomposes when exposed to UV radiation and the resultant "thiyl" radicals could antagonise otherwise stable molecules. Initial tests in polypropylene showed a marked degree of synergy between the two compounds and, as a result, the performance of mixtures was measured in LDPE.

Figure 2:
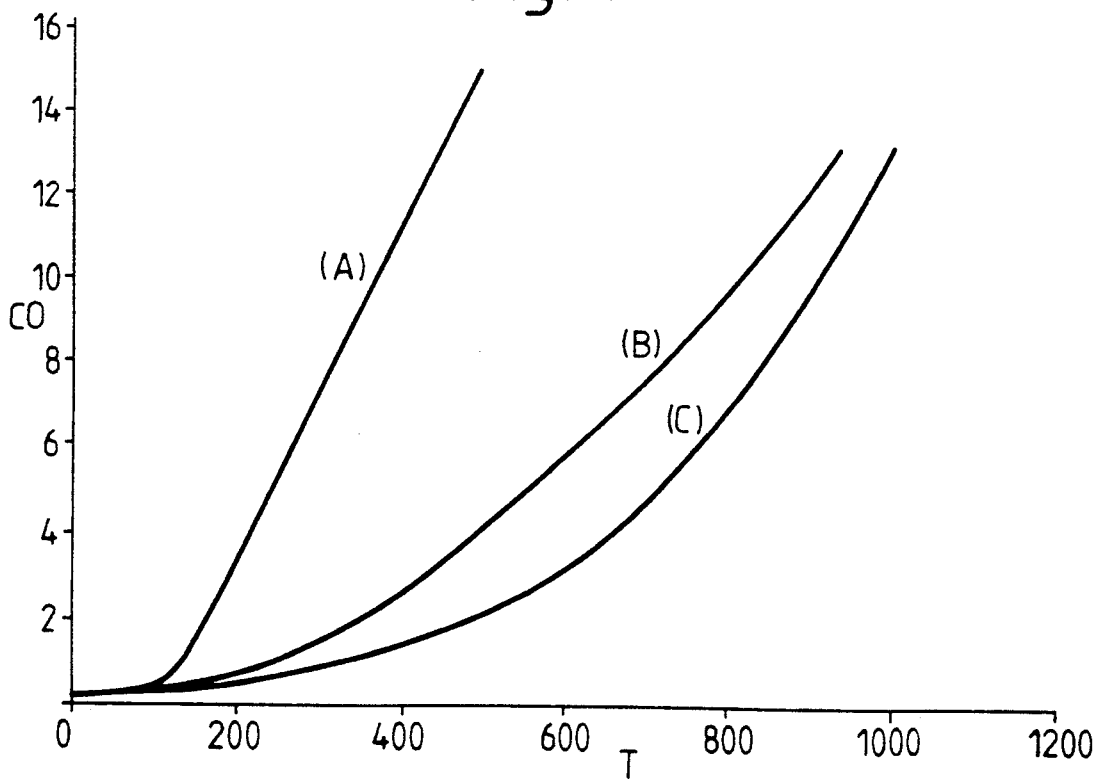

FIG. 2 is a graph of carbonyl index at 1715 cm$^{-1}$(CO) with respect to time of UV radiation (T; hrs) in LDPE for (A) 0.05% MBCD +0.05% ZDNC; (B) 0.05% ZDNC; and (C) 0.05% MBCD. The graph shows the remarkable extent to which the rate of LDPE photo-oxidation is increased as a result of combining ZDNC with MBCD at a level of 0.05% by wt each. After an induction period of ~100 hours, the rate of carbonyl development (speed of embrittlement) is faster than most other "ultra" systems examined.

Figure 3:
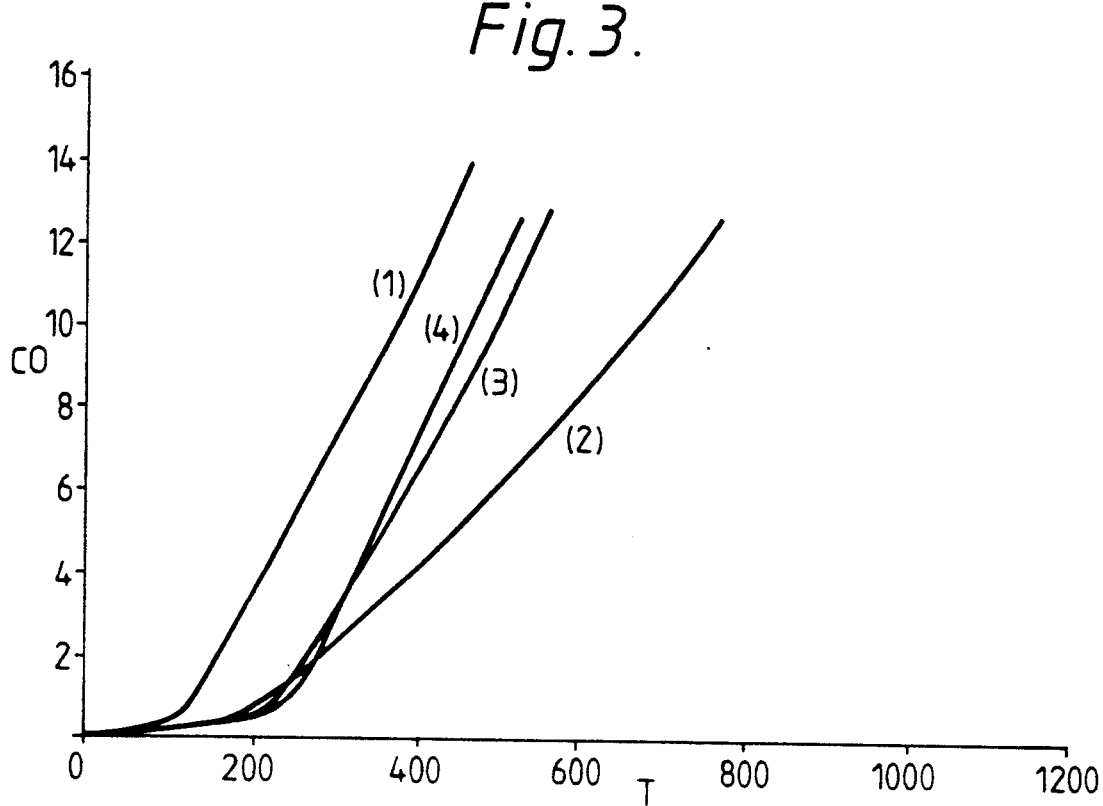
Figure 4:
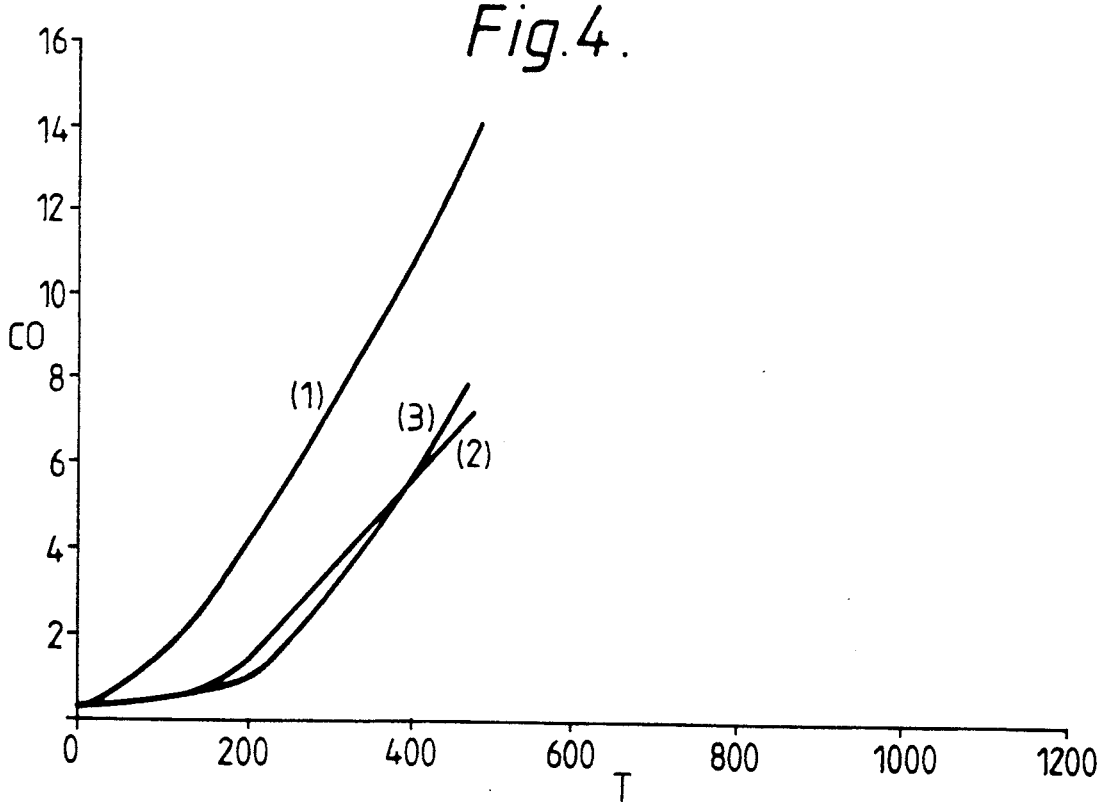

FIG. 3 is a graph analogous to that of FIG. 2, for LDPE +0.05% ZDNC plus (1) 0.05%, (2) 0.1%, (3) 0.15% or (4) 0.2% of MBCD. The graph of FIG. 4 is similar, but for a constant amount (0.05%) of MBCD plus (1) 0.05%, (2) 0.1% or (3) (3) 0.15% ZDNC. These graphs show how induction periods can be altered by, say, a factor of 2-3 when the MBCD concentration is increased.

The contribution to the performance and control of the mixture made by ZDNC is substantial since it has individual efficiency as a melt flow stabiliser and thermal antioxidant. Furthermore, mixtures are colourless and odourless.

EXAMPLE 22

The Mn(II) complex of MBCD was prepared in the laboratory, in near theoretical yield, from manganese sulphate and MBCD in alkali. The complex was a fawn-coloured, odourless, amorphous solid.

Various mixtures of MnMBCD and FeDNC (ferric diisononyldithiocarbonate) were processed with LDPE and compressed into films of standard thickness. These films were exposed to UV light in the UV cabinet, and the rate of carbonyl development was measured at intervals. The combination at various levels provided a wide range of photodegradation rates, in general showing useful synergism. At equal concentrations of 0.1% by wt of each of MnMBCD and FeDNC, the oxidation curve showed a maximum synergic effect, representing the fastest rate of embrittlement of any system tested, including 0.1% ferric acetylacetonate. Films using the two are coloured and, as such, their application may be limited to agriculture, horticulture or trash bags, i.e. possible replacements for the FeDD/NiBuD combination.

EXAMPLE 23

Mixtures of ZDNC and MBCD (0.1% in total) were added to commercial polypropylene, i.e. containing 0.1% of a phenolic anti-oxidant. At mixing ratios of 50:50 and 75:25 (ZDNC:MBCD), a satisfactory relationship between induction and minimum embrittlement time was achieved.

What is claimed is:

1. A polymer composition comprising a polyolefin polymer and a pro-degradant effective amount of a pro-degradant selected from essentially carboxyclic β-diketones and metal complexes thereof of the formula

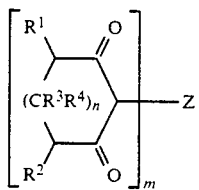

wherein n is 0, 1, 2 or 3; $R^1$, $R^2$, $R^3$ and $R^4$ are independently selected from H, a hydrocarboyl radical or a substituted hydrocarbyl radical of up to 18 C atoms, any substituents using chosen from oxo(=C), Nh$_2$, (di)hydrocarboylamino, acylamino, COOH, hydrocarbyloxycarbonyl, CN, halogen and NO$_2$, or two of $R^1$, $R^2$ and $R^3$, together with the C atoms to which they are attached, form an aromatic ring optionally substituted as defined above, Z is a metal and m is an integer equal to the valence of Z; or $(CR^3R^4)_n$ is replaced by a heteroatom.

2. A polymer composition comprising:
   (1) a polyolefin polymer,
   (2) one or more additives selected from metal di(C$_{5\text{-}20}$ alkyl)dithiocarbamates and thiuram sulfides, and
   (3) a pro-degradent effective amount of a pro-degradant selected from essentially carboxycylic β-diketones and metal complexes thereof of the formula

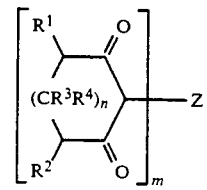

wherein n is 0, 1, 2 or 3; $R^1$, $R^2$, $R^3$ and $R^4$ are independently selected from H, a hydrocarbyl radical or a substituted hydrocarbyl radical of up to 18 C atoms, any substituents being chosen from oxo(=O), NH$_2$, (di)hydrocarbylamino, acylamino, COOH, hydrocarbyloxycarbonyl, CN, halogen and NO$_2$, or two of $R^1$, $R^2$ and $R^3$, together with the C atoms to which they are attached, form an aromatic ring optionally substituted as defined above; and either m is 1 and 2 is H, a metal, a hydrocarbyl radical or a substituted hydrocarbyl radical as defined above, or m is an integer other than 1 and Z is a metal, a hydrocarbyl radical or a substituted hydrocarbyl radical as defined above, having the valency m; or $(CH^3R^4)_n$ is replaced by a heteratom.

3. A film of a composition comprising:
   (1) a polyolefin polymer,
   (2) an antioxidant amount of phenolic and antioxidant,
   (3) from about 0.01 to about 5% by weight of a pro-degradant, and
   (4) optionally one or more additives selected from metal di(C$_{5\text{-}20}$ alkyl)dithiocarbonates and thiuram sulfides, wherein the pro-degradant has the formula

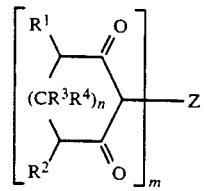

wherein n is 0, 1, 2 or 3; $R^1$, $R^2$, $R^3$ and $R^4$ are independently selected from H, a hydrocarbyl radical or a substituted hydrocarbyl or up to 18 C atoms, any substituents being chosen from oxo(=0), NH$_2$, (di)hydrocarbylamino, acylamino, COOH, hydrocarbyloxycarbonyl, CN, halogen and NO$_2$, or two of $R^1$, $R^2$ and $R^3$, together with the C atoms to which they are attached, form an aromatic ring optionally substituted as defindd above; and m is 2 and Z is —CHR— and R is H a hydrocarbyl radical or a substituted hydrocarbyl radical as defindd above; or $(CR^3R^4)_n$ is replaced by a heteroatom.

4. A compositions according to claim 1, wherein the polyolefin polymer is selected from polypropylene and polyethylene.

5. A composition according to claim 1, which additionally comprises a metal di($C_{5-20}$ alkyl)dithiocarbamate.

6. A composition according to claim 1, wherein the dithiocarbonate is zinc diisononyldithiocarbamate.

7. A composition according to claim 1, which additionally comprises a thiuram sulfide.

8. A composition according to claim 7, wherein the sulfide is tetrabenzylthiuram disulfide.

9. A compositions according to claim 1, which comprises 0.01 to 5% by wt of the pro-degradant, with respect to the polymer.

10. A compositions according to claim 2, wherein m is 2 and Z —CHR—, R is H, a hydrocarbyl radical or a substituted hydrocarbyl radical.

11. A composition according to claim 2, wherein the prodegradant is selected from 2,2'-methylenebis(1,3cyclohexanedione) and 2,2'-benzylidenebis(1,3cyclohexanedione).

12. A composition according to claim 2, which additionally comprises a metal di($C_{5-20}$ alkyl)dithiocarbamate.

13. A composition according to claim 2, wherein the dithiocarbamate is zinc diisononyldithiocarbamate.

14. A composition according to claim 2, which comprises 0.01 to 5% by wt of the pro-degradant, with respect to the polymer.

15. A composition according to claim 3, which additionally comprises a metal di($C_{5-20}$ alkyl)dithiocarbamate.

16. A composition according to claim 3, wherein the dithiocarbamate is zinc diisononyldithiocarbamate.

17. A composition according to claim 11, which comprises 0.01 to 5% by wt of the pro-degradant, with respect to the polymer.

* * * * *